United States Patent Office 3,385,446
Patented May 28, 1968

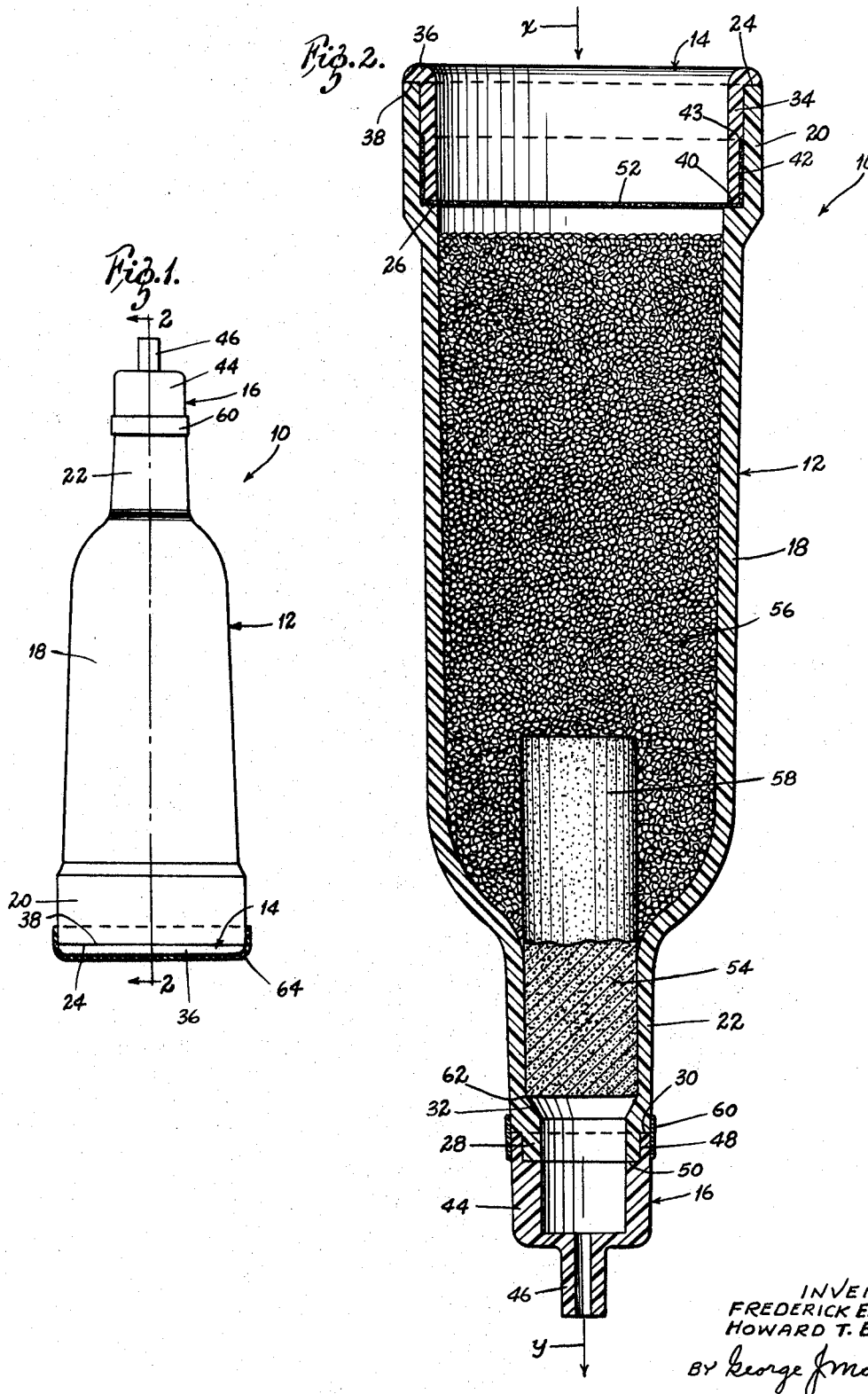

3,385,446
LIQUID FILTERING DEVICE
Frederick E. Ward, Creve Coeur, and Howard T. Becker, St. Louis, Mo., assignors to Ward-Becker Laboratory, Inc., St. Louis, Mo., a corporation of Missouri
Filed Sept. 29, 1967, Ser. No. 671,779
8 Claims. (Cl. 210—266)

ABSTRACT OF THE DISCLOSURE

A novel device wherewith the quality of certain alcoholic beverages as well as drinking water may be improved. Consists of a plastic bottle-simulative container wherein novel filtering media are contained and confined. The liquids to be treated would be introduced into one open end of the container, would flow by gravity through the purifying filter media, and would then be discharged via the opposite open end of the container into an appropriate receptacle. The operation of the device would be manually effected. That is to say, the user while holding the device in one hand would introduce the liquid to be treated thereinto with his other hand. A removable closure cap for the container when not in use is provided. Subsequent to approximately twenty repeated usages for its intended objectives, the device of the invention is deemed to be a disposable item.

Background of the invention

As a general rule, alcoholic beverages of the whiskey, gin and vodka categories are appraised and classified in contemplation of the methods employed in their production. In other words, liquors of the type that have been aged by natural means over a period of years in charred barrels or vats, have a distinctive flavor that is greatly superior to that of liquors which have been subjected to additives and chemical processes designed to impart thereto a similar flavor without resorting to the accepted natural aging procedure. Obviously, the superior or high grade liquors are more expensive than the inferior or low grade liquors, and the primary object of the present invention is to provide a simple filtering device wherewith low grade liquors may be treated or refined so as to be on a par with high grade liquors.

Field of the invention

The invention relates to the filtering of liquids, and provides a simple device that may be held in one hand as the liquid to be filtered is introduced thereinto and then flows therethrough by gravity for discharge into a suitable receptacle.

The device of this invention is primarily directed to the provision of means for the filtering out of fusel oil and other undesirable ingredients usually found in less expensive brands of liquor without changing the alcoholic content of the liquor. The fusel oil referred to generally consists of a mixture of amyl, butyl, propyl and isoamyl alcohol that develops in alcoholic products which have not been distilled properly and for a sufficient length of time to separate the ethyl alcohol from other ingredients having a low boiling point. The filtering device of this invention is also adapted to extract chlorine, and suspended iron undesirable tastes and odors from drinking water.

Summary of the invention

Broadly, the instant invention is comprised of a bottle-like plastic container wherein a mass of granular processed charcoal material, a fine mesh screen element, and a cylindrical element of porous but pervious plastic material are contained and confined. The liquid to be treated would be introduced into the open upper end of the manually held container, would flow by gravity through the filtering media, and thereupon into a dispensing member provided with a spout segment for automatically discharging the filtered liquid into an appropriate therebelow disposed receptacle.

As will appear from the detailed description below and an inspection of the drawings, the bottle-like container when not in use, may be supported in erect position on a surface by means of a removable and replaceable closure cap associated with the bottom portion thereof. When in such disposition, the screen element serves to support the thereabove mass of charcoal material, and to obviate the loss of any of its granular particles. Said fine mesh screen element may be formed of metallic or pliable plastic material.

The charcoal or carbon filtering material would be processed in bulk. That is to say for example, approximately two cubic feet of 10–20 mesh pecan or coconut grade carbon would be soaked in a preferably plastic container together with approximately one and three quarter pounds of a 3% solution of hydrochloric acid 20° Baumé, for 36 hours. This treamtent has been found to eliminate the tendency of the activated carbon to bleed color in consequence of contact with alcohol. Thereupon the thus treated carbon material would be subjected to washing with deionized water until a neutral pH of 7.0 is reached. This treatment removes all of the hydrochloric acid therefrom and thoroughly cleanses the carbon particles. The material is then allowed to become dry, whereupon a determined quantity thereof would be introduced into each container of the invention.

The cylindrical element of porous but pervious plastic material constitutes the final filter agent, and is disposed in the neck portion of the bottle-like container aforesaid. This cylindrical element is comprised of porous polyethylene or the like material, and is pressfitted into said neck segment with its upper end portion projecting into the thereabove mass of granular filter material, as will appear.

The invention is illustrated on a sheet of drawings that accompanies this specification, and a more comprehensive understanding of its features may be had from the detailed description to follow with reference to said drawings.

Brief description of the drawings

FIGURE 1 is a side elevational view of the liquid filtering device comprising the present invention, said device being illustrated in its not-in-use status with a removable closure cap applied to its larger end, said cap being shown in section; and FIGURE 2 is an enlarged or actual size central sectional view taken on the line 2—2 of FIGURE 1, the device however being shown inverted relatively to FIGURE 1 to illustrate its in-use status with the closure cap removed.

Description of the preferred embodiment

The filtering device of the present invention is designated as a whole by the numeral 10. It includes as its major structural components: a bottle-like container 12; a ring element 14; and a filtered liquid dispensing member 16. All of these major components are molded of preferably opaque plastic material. Inasmuch as FIGURE 2 illustrates the device 10 in operative disposition, certain terms employed in the detailed description to follow will be based on that view, as should be understood.

The container 12 includes a cylindrical main body 18 that merges at its upper end into a larger diametered cup-shaped portion 20, and at its lower end into a smaller diametered neck portion 22. It should be observed that said main body is slightly tapered from its mergence into the cup-shaped portion 20 to its mergence into the neck portion 22. The cup-shaped portion 20 terminates at the top in a flat annular brim surface 24, and has a flat annular shoulder 26 formed therein as shown. The neck portion 22 terminates at the bottom in a reduced segment 28 whereby to form therein a flat annular external shoulder 30. Numeral 32 designates an inwardly and downwardly tapered annular internal shoulder formed in said neck portion upwardly of the external shoulder 28, for a reason to appear.

The ring element 14 is comprised of a main body portion 34 surmounted by an annular brim 36. The brim 36 includes a flat annular surface 38 adapted to engage against the similar rim surface of the container portion 20, as shown. The external periphery of the main body portion 34 corresponds with the internal periphery of said cup-shaped portion 20 for approximately one half the distance between the surface 38 and the flat bottom face 40 thereof, an annular recess 42 being formed in said external periphery as illustrated. Numeral 43 designates an annular shoulder that defines the upper extent of the recess 42.

The liquid dispensing member 16 is comprised of a main body portion 44 and a therefrom depending spout segment 46. A circular recess 48 formed in said main body provides an internal shoulder 50 therein. The recess 48 receives the reduced segment 28 of the container neck portion 22, with the bottom face of said segment in contact with the shoulder 50, and the top face of the dispensing member 16 in contact with the flat shoulder 30 of said container neck portion 22, as clearly illustrated.

Numeral 52 designates a fine mesh metallic or plastic screen element, originally of circular form and of a determined diameter, that when assembled into the device 10 as will be explained, assumes the cup-shaped appearance illustrated. Numeral 54 designates an elongated cylindrical filter element having a peripheral diameter corresponding to that of the internal periphery of the container neck segment 22. The element 54 is molded of porous polyethylene or the like, that is permeable so that liquid may pass therethrough. Numeral 56 designates a mass of processed granular charcoal or carbon disposed within the main body 18 of the container 12 about the thereinto extending upper end portion 58 of the filter element 54, and the thereabove screen element 52.

In assembling the device 10, the dispensing member 16 would be pressfitted onto the reduced segment 28 of the container neck portion 22 to provide a positive seal against leakage at the shoulder 30, this seal being preferably enhanced by an annular band 60 of adhesively applied impervious material as shown. The filter element 54 would be pressfitted into the neck portion 22 until its bottom peripheral edge 62 abuts against the upper margin of the shoulder 32. A determined mass 54 of processed granular carbon would then be introduced into the container. Thereupon the screen element 52, in circular form, would be properly positioned atop the brim surface 24, whereupon the ring element 14 would be superimposed, as should be understood. Manual downward pressure applied to the brim 36 until the flat surface 38 thereof engaged against the rim 24, would complete the assembly operation. In consequence of this final operation, the screen element 52 would automatically be formed into the cup-shaped configuration shown, with its bottom peripheral edge confined between the bottom face 40 of the ring element 14, and the internal shoulder 26 of the container upper end portion 20. The surplus expanse of the screening would automatically extend into the annular recess 42, and be confined therein by the adjacent inner peripheral surface of the container portion 20, and the annular shoulder 43.

With attention directed to FIGURE 1, it is noted that at the time of manufacture as well as during intervals obtaining between usage of the device 10, a removable closure cap 64 would be applied thereto. The cap 64 is preferably molded of plastic, and is so diametered as to have a frictional fit onto the brim 36 of the ring element 34 and the adjacent periphery of the container portion 20. It should be noted that with the device 10 in such position, the screen element 52 serves to retain the carbon particle mass 56 within the main body 18 of the container 12.

*Use*

It will be assumed that a person having the device 10 as shown in FIGURE 1 on hand, also possesses for example, a quart bottle of inferior whiskey. Desiring to improve the palatability of the whiskey, he would invert the device 10 to the position thereof shown in FIGURE 2, and remove the closure cap 64. Thereupon holding the thus inverted device 10 with one hand, he would simply pour the contents of the whiskey bottle thereinto as suggested by the arrow $x$. It will of course also be assumed that he had placed an appropriate receptacle beneath the spout 46 of the dispensing member 16 to receive the filtered whiskey when it flows from the device 10 as suggested by the arrow $y$.

As the whiskey passes therethrough, minute impure particles existent in the whiskey would be trapped and thus removed therefrom via the fine mesh screen 52. Thereupon, flowing downwardly by gravity through the mass 56 of processed grannular carbon filtering media, the fused oil and other undesirable ingredients normally existent in whiskies or the like that had not been aged naturally or distilled properly would be dissipated, or so to speak, absorbed by said media. Thereupon, flowing by gravity into and through the filter element 54, the now refined whiskey would discharge via the spout segment 46 of the dispensing member 16 into a receptacle therebelow (not shown).

Numerous tests have proven that a quart of liquor or a quart of water may be introduced thereinto, flow therethrough by gravity, and be discharged from the device 10 in approximately four minutes. Tests have also demonstrated that the device loses its effectiveness subsequent to usage for about twenty filtering operations, and should then be discarded.

In view of the foregoing description and the accompanying drawing, it is believed that a comprehensive presentation of the present invention has been given. It should of course be understood that the structural details of the device 10 may be modified somewhat without departing from the main concepts of the present invention, as defined in the claims hereunto appended.

What is claimed is:

1. A device adapted to be manually held for filtering certain liquids introduced thereinto and passing therethrough by gravity, said device comprising in combination:

a bottle-like plastic container including a main body merging at one end into a larger diameter cup-shaped portion and at its opposite end into a smaller diameter neck portion;

means for rigidly securing a fine mesh screen element in position to form a bottom wall for said cup-shaped portion;

an elongated cylindrical filter element having one end portion pressfitted into said neck portion and its opposite end portion extending freely into the main body;

a determined mass of processed granular carbon material of the character described disposed within said main body of the container about the thereinto extending portion of the cylindrical filter element, the top level of said mass being below the screen element aforesaid when the device is in use; and a dispensing member including a depending spout sealingly affixed to the lower end of the container neck segment for discharging the liquid into an appropriate receptacle.

2. The combination of claim 1 wherein the container body is tapered slightly from its mergence into said larger diameter cup-shaped portion to its mergence into said smaller diametered neck portion.

3. The combination of claim 1, wherein the means for rigidly securing the fine mesh screen element in position comprise:
   a flat annular shoulder formed internally in the region of mergence of the container main body into the cup-shaped portion thereof, said cup-shaped portion terminating at the top in a flat annular rim surface;
   a ring element having a main body portion surmounted by an annular brim having a flat bottom face, the external periphery of said ring element main body portion being in correspondence with the internal periphery of the container cup-shaped portion whereby the ring element may be pressfitted into said cup-shaped portion by manually applied pressure exerted against said brim; and
   an annular recess formed in the external periphery of the ring element main body portion, said recess being defined at the top by an annular shoulder.

4. The combination of claim 1, wherein the elongated cylindrical filter element is molded of porous polyethylene or the like material.

5. The combination of claim 1, wherein said container neck portion has formed therein an inwardly and downwardly tapered annular shoulder forming an abutment for the lower peripheral edge of said elongated cylindrical element.

6. The combination of claim 1 wherein said mass of granular carbon material constitutes a determined quantity from a bulk of approximately two cubic feet of 10-20 mesh pecan or coconut grade carbon that had been soaked in a plastic container together with approximately one and three quarter pounds of a 3% solution of hydrochloric acid 20° Baumé for 36 hours, had thereupon been washed with deionized water until a neutral pH of 7.0 was reached, and then had been allowed to dry.

7. The combination of claim 1, wherein the container neck portion terminates at the bottom in a reduced end segment whereby to provide a flat annular external shoulder therein; and wherein the dispensing member includes a main body portion provided with a similar complementary internal shoulder whereby said dispensing member is adapted to be pressfitted onto the said reduced end segment; and wherein an annular band of impervious material adhesively applied about the juncture of said neck and said dispensing member serves to enhance the seal effected by the pressfitted interengagement thereof.

8. The combination of claim 1, and a removable closure cap molded of plastic and diametered so as to provide for frictional engagement thereof with said brim of the ring element and the periphery of the thereto adjacent cup-shaped portion of the container main body.

References Cited
UNITED STATES PATENTS

| | | | |
|---|---|---|---|
| 2,148,770 | 2/1939 | Mittendorf | 210—266 |
| 2,283,989 | 5/1942 | Henry | 210—266 |
| 2,581,125 | 1/1952 | Morrison | 210—282 X |

SAMIH N. ZAHARNA, *Primary Examiner.*